US009468898B2

(12) United States Patent
Matsuoka et al.

(10) Patent No.: US 9,468,898 B2
(45) Date of Patent: Oct. 18, 2016

(54) REACTOR, REACTION METHOD, AND REACTION PRODUCT

(71) Applicant: Kabushiki Kaisha Kobe Seiko Sho (Kobe Steel, Ltd.), Kobe-shi (JP)

(72) Inventors: Akira Matsuoka, Kobe (JP); Akitoshi Fujisawa, Kobe (JP); Koji Noishiki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/698,999

(22) Filed: Apr. 29, 2015

(65) Prior Publication Data

US 2015/0314258 A1 Nov. 5, 2015

(30) Foreign Application Priority Data

May 2, 2014 (JP) ................................ 2014-095350

(51) Int. Cl.

*C08F 2/00* (2006.01)
*F28D 7/00* (2006.01)
*B01J 19/00* (2006.01)
*B01J 19/24* (2006.01)

(52) U.S. Cl.

CPC ......... *B01J 19/0093* (2013.01); *B01J 19/0013* (2013.01); *B01J 19/248* (2013.01); *B01J 19/2445* (2013.01); *B01J 2219/00076* (2013.01); *B01J 2219/0086* (2013.01); *B01J 2219/00786* (2013.01); *B01J 2219/00804* (2013.01); *B01J 2219/00873* (2013.01); *B01J 2219/00889* (2013.01); *B01J 2219/00891* (2013.01); *B01J 2219/00959* (2013.01); *B01J 2219/00961* (2013.01); *B01J 2219/00963* (2013.01); *B01J 2219/00984* (2013.01); *B01J 2219/2401* (2013.01)

(58) Field of Classification Search

CPC B01J 19/0013; B01J 19/248; B01J 19/2445; B01J 2219/2401; B01J 2219/00076
USPC ............................................ 526/72; 422/200
See application file for complete search history.

(56) References Cited

U.S. PATENT DOCUMENTS 6,921,518 B2 * 7/2005 Johnston ................ B01J 8/0221 422/198
2014/0166137 A1 * 6/2014 Noishiki ................. B01J 19/00 137/602

FOREIGN PATENT DOCUMENTS

JP 2013-56315 3/2013

* cited by examiner

*Primary Examiner* — William Cheung
(74) *Attorney, Agent, or Firm* — Oblon, McClelland, Maier & Neustadt, L.L.P.

(57) ABSTRACT

A reactor and a reaction method are provided with which temperature changes due to a large amount of reaction heat generated immediately after confluence of raw material fluids can be suppressed. A reactor (2) includes reaction passages (22) and temperature control passages (42). Each reaction passage (22) includes first and second supply passage parts (24, 26), a confluence part (30), and a reaction passage part (28) connected in this order from upstream to downstream. Each temperature control passage (42) includes: first temperature control passage parts (44) extending at least along a particular range of the corresponding reaction passage part (28); and a second temperature control passage part (46) connected thereto, which is fewer in number than the first temperature control passage parts (44). Each second temperature control passage part (46) has a cross section area larger than that of each first temperature control passage part (44).

4 Claims, 4 Drawing Sheets

REACTOR, REACTION METHOD, AND REACTION PRODUCT

BACKGROUND OF THE INVENTION

1. Field of the Invention

The present invention relates to a reactor, a reaction method, and a reaction product.

2. Description of the Related Art

Conventionally, a reactor is known that includes fine flow passages that allow a plurality of different raw material fluids to react with each other while the raw material fluids are being circulated therethrough. JP 2013-56315 A discloses an example of such a reactor.

Patent Document 1 discloses a flow passage structure as a reactor. In this flow passage structure, a plurality of flow paths as fine flow passages that allow raw material fluids to react are provided. Each flow path includes a first introduction passage into which a first fluid is introduced, a second introduction passage into which a second fluid is introduced, and a confluence fluid passage that is connected to the downstream sides of the first and second introduction passages. Further, in the flow passage structure, a plurality of temperature control flow passages are provided through which a temperature control fluid for controlling the temperature of fluids flowing through the paths is circulated.

SUMMARY OF THE INVENTION

Incidentally, in chemical reaction between raw material fluids, temperature is a factor that significantly influences the process efficiency in some cases. More specifically, there is a risk that changes in temperature cause the production of a byproduct to increase, which reduces the reaction yield of a main product. Then, upon reaction between raw material fluids, reaction heat is generated, and this reaction heat is an important factor that causes temperature changes. The reaction heat generated by reaction between raw material fluids is highest immediately after raw material fluids having passed through first and second introduction passages join in a flow path, and thereafter the heat gradually decreases as the reaction is proceeding while the raw material fluids are flowing through the confluence fluid passage. Therefore, how to suppress temperature changes that are caused by a large amount of reaction heat that is generated immediately after confluence of raw material fluids becomes in question.

The present invention has been made to solve the above-described problem, and it is an object of the present invention to suppress temperature changes that are caused by a large amount of reaction heat that is generated immediately after confluence of a plurality of raw material fluids.

As one method for achieving the above-described object, the following can be considered: each temperature control passage is modified to a finer flow passage and the number of temperature control passages provided in a reactor is increased so that the total heat transfer area of all of the temperature control passages is increased, whereby the temperature control function achieved by a temperature control fluid flowing through the temperature control passages is improved. More specifically, by increase in the total heat transfer area of all of the temperature control passages, the heat removal effect achieved by the temperature control fluid flowing through the temperature control passages is improved. This makes it possible that, even if a large amount of reaction heat is generated immediately after the confluence of raw material fluids in a confluence part, temperature changes due to the large amount of reaction heat can be suppressed.

In the case where each temperature control passage is to be made finer, however, another problem as follows arises: pressure loss in each temperature control passage increases, and energy costs necessary for causing temperature control fluids to flow through the temperature control passages increase. In addition, as described above, in the case where the number of the temperature control passages is increased and each of the temperature control passages is made finer, the pressure loss in the temperature control passages in the reactor as a whole significantly increases. Consequently, the energy cost also significantly increases. Then, the inventors of the present invention have invented a reactor and a reaction method as described below, to solve such a problem.

A reactor according to the present invention includes: a reaction passage that is a fine flow passage that allows a plurality of different raw material fluids to react with each other while the raw material fluids are being circulated therethrough; and a temperature control passage that is a fine flow passage that allows a temperature control fluid to be circulated therethrough, the temperature control fluid being used for controlling temperature of the raw material fluids flowing through the reaction passage, wherein the reaction passage includes; a plurality of supply passage parts to which the plurality of the different raw material fluids are introduced, respectively; a confluence part that is connected to downstream-side ends of the plurality of the supply passage parts and allows the plurality of the raw material fluids inflowing from the plurality of the supply passage parts to join; and a reaction passage part that is connected to a downstream side of the confluence part and allows the plurality of the raw material fluids inflowing from the confluence part to react with each other while being circulated therethrough; wherein the temperature control passage includes: a plurality of first temperature control passage parts each of which has a part that extends along at least a particular range from the confluence part to the reaction passage part on the downstream side, in the reaction passage; and second temperature control passage parts which are connected to downstream-side ends of the plurality of the first temperature control passage parts, the number of the second temperature control passage parts being smaller than the number of the plurality of the first temperature control passage parts; and wherein an area of a cross section of each second temperature control passage part in a direction perpendicular to a flow direction of the temperature control fluid in the second temperature control passage part is greater than an area of a cross section of each first temperature control passage part in a direction perpendicular to a flow direction of the temperature control fluid in the first temperature control passage part.

In this reactor, the number of the first temperature control passage parts having smaller cross section areas, which are provided along at least a particular range from the confluence part to the reaction passage part on the downstream side, in the reaction passage, is greater than the number of the second temperature control passage parts connected to the downstream-side ends of the first temperature control passage parts. Therefore, in the vicinities of a region from the confluence parts to the specific position in the reaction passages, where a large amount of reaction heat is generated, the heat removal effect of the temperature control fluid flowing through the first temperature control passage parts can be improved, whereby temperature changes due to a large amount of reaction heat can be suppressed.

In addition, in this reactor, the number of the second temperature control passage parts, which are connected to the downstream side of the first temperature control passage parts, is smaller than the number of the first temperature control passage parts, and each second temperature control passage part has a cross section having an area greater than that of the first temperature control passage part. This makes it possible to reduce the pressure loss in the second temperature control passage part. Therefore, even if the pressure loss increases in the first temperature control passage part, the reduction of the pressure loss in the second temperature control passage part makes it possible to suppress an increase in the pressure loss in the temperature control passage as a whole. Consequently, an increase in energy costs necessary for causing the temperature control fluid to flow through the temperature control passage can be suppressed.

Moreover, in the downstream-side area where the second temperature control passage parts are provided, the reaction between the raw material fluids in the reaction passage parts have already proceeded, and the reaction heat generated therein is small. Therefore, even if the provision of fewer second temperature control passage parts having a larger cross section area decreases the heat removal effect achieved by the temperature control fluid flowing through the second temperature control passage parts as compared with the heat removal effect achieved by the first temperature control passage parts, temperature changes due to the reaction heat can be sufficiently suppressed. In this reactor, therefore, in both of the area where a large amount of reaction heat is generated immediately after the confluence of the raw material fluids and the area where the reaction thereafter proceeds and the amount of the reaction heat decreases, a sufficient heat removal effect is exhibited appropriately so that temperature changes can be suppressed, whereby a decrease in the reaction yield of the main product can be suppressed.

In the reactor, preferably the area of the cross section of the second temperature control passage part is greater than a sum of the areas of the cross sections of the plurality of the first temperature control passage parts.

With this configuration, the pressure loss in the second temperature control passage parts can be reduced further. Therefore, an increase in the energy costs necessary for causing the temperature control fluid to flow through the temperature control passages can be suppressed more surely.

The above-described reactor further includes: a plurality of reaction passage layers in each of which a plurality of the reaction passages arranged in parallel are provided; and a plurality of temperature control passage layers in each of which a plurality of the temperature control passages arranged in parallel are provided, wherein the reaction passage layers and the temperature control passage layers are alternately stacked.

This configuration makes it possible to increase the amount of the main product produced by the reaction between the raw material fluids in the reactor as a whole, and at the same time, to suppress temperature changes by effectively removing the reaction heat generated by the reaction, thereby suppressing a decrease in the reaction yield of the main product.

Further, a reaction method according to the present invention is a reaction method using the above-described reactor, and includes: a raw material supply step of supplying the different raw material fluids to a plurality of the supply passage parts of the reaction passage, respectively; a reaction step of causing the raw material fluids to flow from each supply passage part to the confluence part so as to allow the raw material fluids to join, and allowing the raw material fluids having become confluent in the confluence part to react with each other while the raw material fluids are circulated through the reaction passage part; and a temperature control step of allowing the temperature control fluid to be circulated through the temperature control passage, thereby controlling temperature of the raw material fluids flowing through the reaction passage part.

By this reaction method, the same effects as those achieved by the above-described reactor can be achieved: that is, temperature changes due to reaction heat can be suppressed whereby a decrease in the reaction yield of the main product can be suppressed, and an increase in the energy costs necessary for causing the temperature control fluid to flow through the temperature control passages can be suppressed.

In the above-described reaction method, in the reaction step, polymerization reaction may be allowed to occur between the raw material fluids.

With this configuration, a product produced by polymerization reaction can be obtained at a good yield.

A reaction product according to the present invention is a reaction product produced by allowing a plurality of the raw material fluids to react with each other by using the above-described reaction method.

As described above, according to the present invention, temperature changes due to reaction heat can be suppressed whereby a decrease in the reaction yield of the main product can be suppressed, and an increase in the energy costs necessary for causing the temperature control fluid to flow through the temperature control passages can be suppressed.

DESCRIPTION OF THE PREFERRED EMBODIMENT

Figure 1:
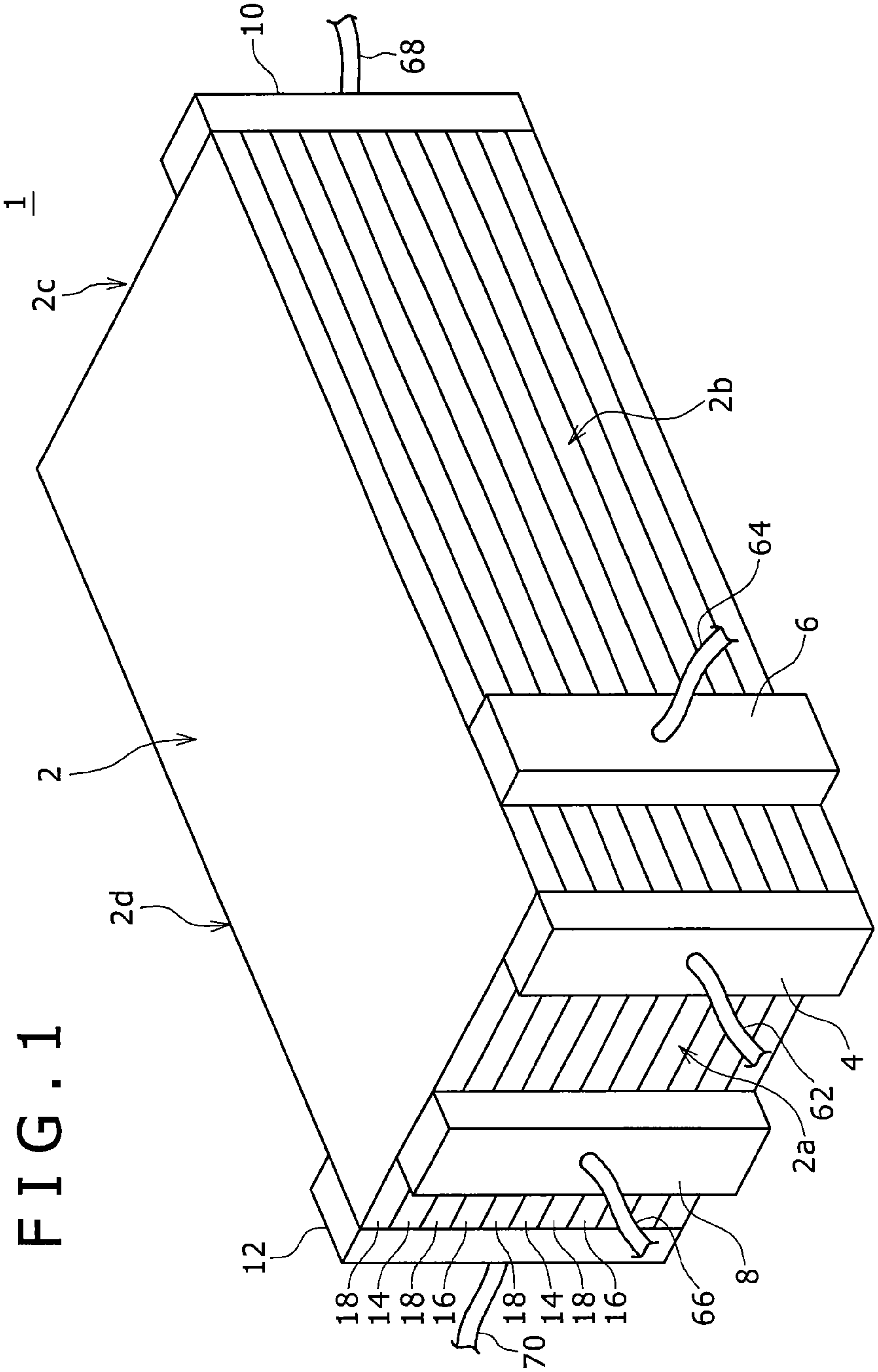
FIG. 1 is a perspective view of a reaction device according to one embodiment of the present invention.

The following describes embodiment of the present invention, while referring to the drawings.

A reaction device 1 according to one embodiment of the present invention is a so-called microreactor. As illustrated in FIG. 1, this reaction device 1 includes a reactor 2, a first raw material supply header 4, a second raw material supply header 6, a reaction fluid discharge header 8, a temperature control supply header 10, a temperature control discharge header 12, a first supply pipe 62, a second supply pipe 64, a reaction fluid discharge pipe 66, a temperature control supply pipe 68, and a temperature control discharge pipe 70.

The reactor 2 is a rectangular parallelepiped structure for causing reaction between raw material fluids in the inside thereof. The reactor 2 includes, in the inside thereof, a multiplicity of reaction passages 22 (see FIG. 2) and a multiplicity of temperature control passages 42 (see FIG. 3). As illustrated in FIG. 1, the reactor 2 is composed of a plurality of reaction passage substrates 14, a plurality of temperature control passage substrates 16, and a plurality of sealing plates 18. The reactor 2 is formed in the following manner: the reaction passage substrates 14 and the temperature control passage substrates 16 are alternately stacked, with the sealing plates 18 being interposed therebetween, and these substrates and plates 14, 16, and 18 are bonded with one another. In the present embodiment, the reactor 2 is configured so that the stacking direction in which the substrates and plates 14, 16, and 18 are stacked coincides with the top-bottom direction of the reactor 2.

The reactor 2 has four side surfaces. More specifically, the reactor 2 has a first side surface 2*a*, a second side surface 2*b*, a third side surface 2*c*, and a fourth side surface 2*d*. These side surfaces 2*a*, 2*b*, 2*c*, and 2*d* are arranged so as to be perpendicular to both of end faces of the reactor 2 in the stacking direction of the substrates and plates 14, 16, and 18, that is, so as to be perpendicular to upper and lower surfaces. The first side surface 2*a* and the third side surface 2*c* are side surfaces on opposite sides to each other. The second side surface 2*b* and the fourth side surface 2*d* are arranged on opposite sides to each other so as to be perpendicular to the first side surface 2*a* and the third side surface 2*c*.

Figure 2:
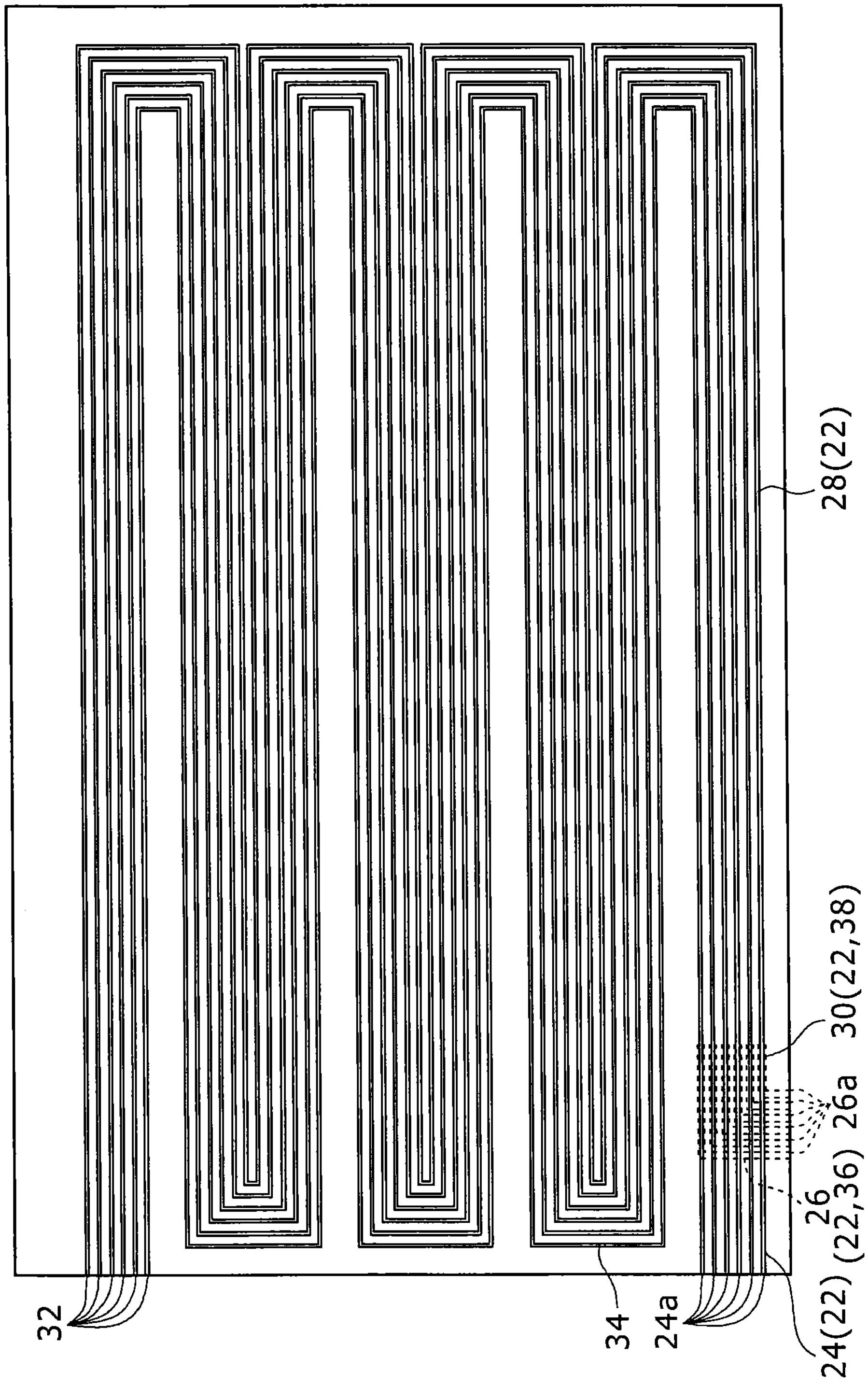
FIG. 2 is a plan view of a reaction passage substrate that composes a reactor of the reaction device illustrated in FIG. 1.

The reaction passage substrate 14 (see FIG. 2) is a rectangular flat plate in which a plurality of reaction passages 22 are formed. This reaction passage substrate 14 is an exemplary reaction passage layer according to the present invention. The reaction passage substrate 14 is formed with, for example, stainless steel. Each reaction passage 22 is, in the present embodiment, a fine flow passage (microchannel) that allows two different raw material fluids to react with each other while being circulated therethrough. All of the reaction passages 22 formed on one reaction passage substrate 14 are arranged in parallel, along the plate surface of the reaction passage substrate 14. Each reaction passage 22 has a fine flow passage width (several micrometers to several millimeters). As illustrated in FIG. 2, each reaction passage 22 includes a first supply passage part 24, a second supply passage part 26, a reaction passage part 28, and a confluence part 30.

The first supply passage part 24 is a part for introducing a first raw material fluid, which is one of the above-described two different raw material fluids, and supplying the first raw material fluid introduced thereto to the confluence part 30 corresponding thereto. The first supply passage part 24 has, at an end thereof, a first inlet port 24*a* (see FIG. 2) for introducing the first raw material fluid into the inside of the first supply passage part 24. The first inlet port 24*a* has an opening on the first side surface 2*a* (see FIG. 1) of the reactor 2. The first inlet port 24*a* is arranged in an area adjacent to the second side surface 2*b*, in the first side surface 2*a*. The first supply passage part 24 (see FIG. 2) extends from the first inlet port 24*a* into the inside of the reactor 2, in a direction perpendicular to the first side surface 2*a*.

The second supply passage part 26 (see FIG. 2) is a part for introducing a second raw material fluid, which is the other one of the above-described two different raw material fluids, and supplying the second raw material fluid introduced thereto to the confluence part 30 corresponding thereto. The second supply passage part 26 has, at an end thereof, a second inlet port 26*a* (see FIG. 2) for introducing the second raw material fluid into the inside of the second supply passage part 26. The second inlet port 26*a* has an opening on a second side surface 2*b* (see FIG. 1) of the reactor 2. The second inlet port 26*a* is arranged in an area adjacent to the first side surface 2*a*, in the second side surface 2*b*. The second supply passage part 26 (see FIG. 2) extends from the second inlet port 26*a* into the inside of the reactor 2, in a direction perpendicular to the first supply passage part 24 corresponding thereto, bends at a right angle at a position overlapping the corresponding first supply passage part 24 as viewed in the stacking direction, and extends along the first supply passage part 24 to the downstream side.

The confluence part 30 (see FIG. 2) is connected to downstream-side ends of first and second supply passage parts 24, 26 corresponding thereto. The confluence part 30 is a part for joining the first raw material fluid that flows from the first supply passage part 24 corresponding thereto and the second raw material fluid that flows from the supply passage part 26 corresponding thereto.

The reaction passage part 28 (see FIG. 2) is connected to the downstream side of the confluence part 30 corresponding to the reaction passage part 28 concerned. The reaction passage part 28 is a part where the first and second raw material fluids, having become confluent at the confluence part 30, inflow and react with each other while the raw material fluids are being circulated therethrough. The reaction passage part 28 is formed in the following manner: the reaction passage part 28 extends from the confluence part 30 corresponding thereto along an extension line of the first supply passage part 24 corresponding thereto, and thereafter it is turned back; then, the reaction passage part 28 is formed so as to go back and forth repeatedly between the first side surface 2*a* (see FIG. 1) and the third side surface 2*c* (see FIG. 1) in a meandering shape.

The reaction passage part 28 includes a reaction passage outlet port 32 for discharging the raw material fluids and a reaction product that have flown through the reaction passage part 28. The reaction passage outlet port 32 is provided at a downstream-side end of the reaction passage part 28, the downstream-side end being an end opposite to the confluence part 30. The reaction passage outlet port 32 has an opening on the first side surface 2*a* (see FIG. 1) of the reactor 2. The reaction passage outlet port 32 is arranged in an area close to the fourth side surface 2*d* (see FIG. 1), in the first side surface 2*a*.

On an upper surface of each reaction passage substrate 14, which is one of plate surfaces of each reaction passage substrate 14 in the thickness direction, a plurality of first reaction grooves 34 (see FIG. 2), which are very fine, are formed by etching or the like; the first reaction grooves 34 are provided for forming the first supply passage parts 24 and the reaction passage parts 28 of the reaction passages 22. On a lower surface of each reaction passage substrate 14, which is the other plate surface of each reaction passage substrate 14 in the thickness direction, a plurality of second reaction groove 36 (see FIG. 2), which are very fine, are formed by etching or the like; the second reaction grooves 36 are provided for forming the second supply passage parts 26 of the reaction passages 22. Further, in each reaction passage substrate 14, a plurality of through holes 38 are formed so as to pass through the reaction passage substrate 14 in the thickness direction. Each through hole 38 is provided at an end position opposite side to the second inlet port 26*a* of each second reaction groove 36, so as to connect the end of the second reaction groove 36 and the first reaction groove 34 corresponding thereto. With these through holes 38, the confluence parts 30 are formed.

On the upper surface and the lower surface of each reaction passage substrate 14, sealing plates 18 (see FIG. 1) are stacked and bonded. Openings of the first reaction grooves 34 (see FIG. 2) formed on the upper surface of each reaction passage substrate 14 are sealed by the sealing plate 18 bonded to the upper surface, whereby the first supply passage part 24 and the reaction passage part 28 of each reaction passage 22 of the reaction passage substrate 14 are formed. Further, openings of the second reaction grooves 36 formed on the lower surface of each reaction passage substrate 14 are sealed by the sealing plate 18 bonded to the lower surface, whereby the second supply passage part 26 of each reaction passage 22 of the reaction passage substrate 14 are formed.

Figure 3:
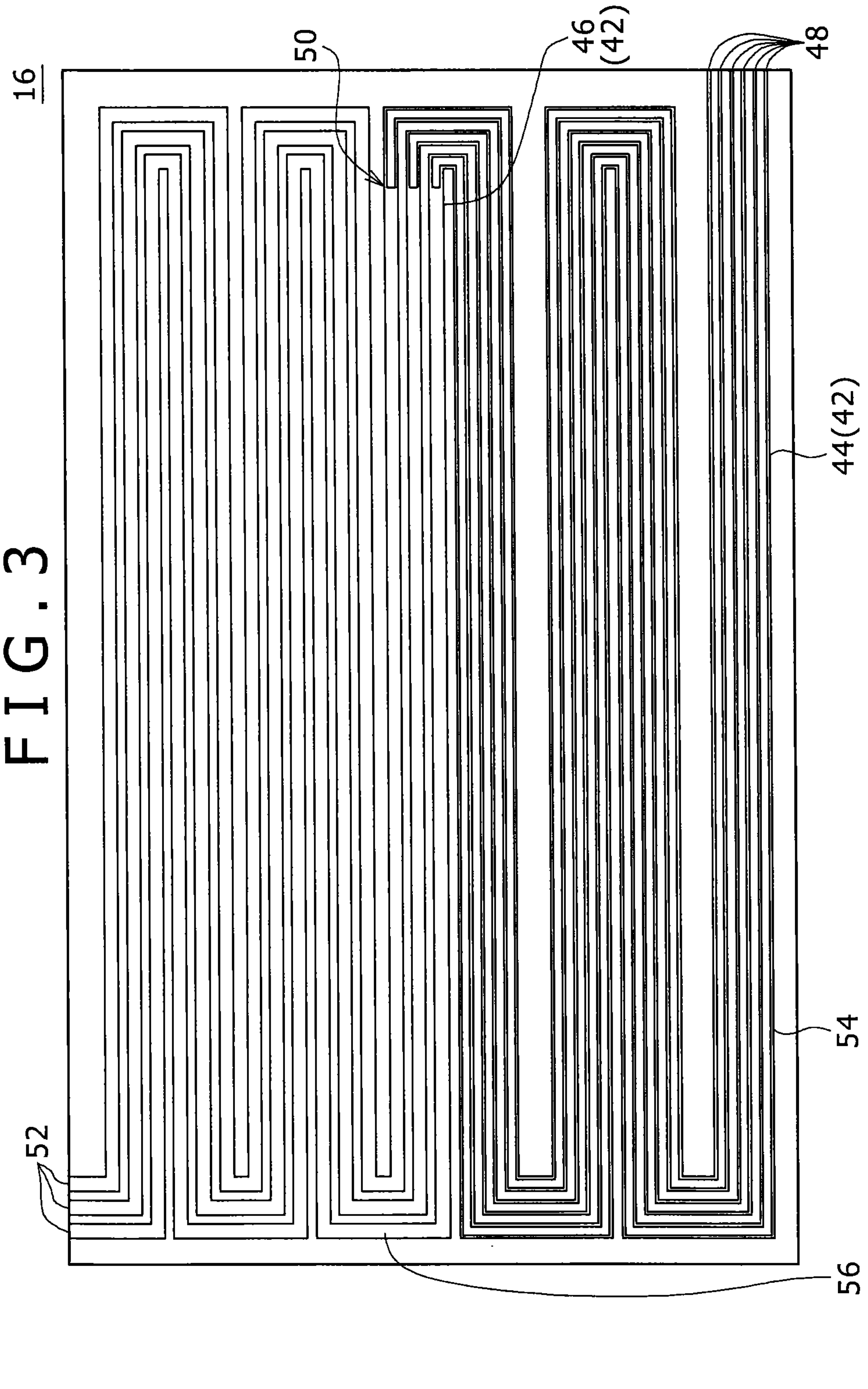
FIG. 3 is a plan view of a temperature control passage substrate that composes a reactor of the reaction device illustrated in FIG. 1.

The temperature control passage substrate 16 (see FIG. 3) is a rectangular flat plate in which a plurality of temperature control passages 42 are formed. This temperature control passage substrate 16 is an exemplary temperature control passage layer according to the present invention. The temperature control passage substrate 16 is formed with the same material as that of the reaction passage substrate 14, and has the same outer shape as that of the reaction passage substrate 14. Each temperature control passage 42 is a fine flow passage (microchannel) that allows a temperature control fluid to be circulated therethrough. The temperature control fluid is used for controlling the temperature of the raw material fluids flowing through the reaction passage 22 (see FIG. 2). In the case where the reaction between the raw material fluids in the reaction passages 22 is an exothermic reaction, a low-temperature temperature control fluid is flown through each temperature control passage 42 for cooling. As the low-temperature temperature control fluid (refrigerant), water, acetone, liquefied nitrogen, brine, or the like is used. On the other hand, in the case where the reaction between the raw material fluids in the reaction passages 22 is an endothermic reaction, a high-temperature temperature control fluid is flown through each temperature control passage 42 for heating. All of the temperature control passages 42 formed in one temperature control passage substrate 16 (see FIG. 3) are arranged in parallel along the plate surface of the temperature control passage substrate 16. As illustrated in FIG. 3, each temperature control passage 42 includes two first temperature control passage parts 44 and one second temperature control passage part 46.

The first temperature control passage part 44 is equivalent to the upstream-side half of the temperature control passage 42, and the second temperature control passage part 46 is equivalent to the downstream-side half of the temperature control passage 42. Each temperature control passage 42 has, at an end thereof, a temperature control introduction port 48 (see FIG. 3) for introducing the temperature control fluid into the temperature control passage 42; and at the other end thereof, a temperature control discharge port 52 (see FIG. 3) for discharging the temperature control fluid from the temperature control passage 42.

The temperature control introduction port 48 is provided at an upstream-side end of each first temperature control passage part 44. The temperature control introduction port 48 has an opening on the third side surface 2*c* (see FIG. 1) of the reactor 2. The temperature control introduction port 48 is arranged in an area of the third side surface 2*c* corresponding to the area of the first side surface 2*a* where the first inlet port 24*a* is arranged. In other words, the temperature control introduction port 48 is arranged in an area adjacent to the second side surface 2*b*, in the third side surface 2*c*.

Each first temperature control passage part 44 is formed in the following manner: the first temperature control passage part 44 extends from the temperature control introduction port 48 to the first side surface 2*a* (see FIG. 1) side, and thereafter it is turned back; then, the first temperature control passage part is formed so as to go back and forth repeatedly between the first side surface 2*a* and the third side surface 2*c* in a meandering shape. In the first temperature control passage part 44 (see FIG. 3), a part thereof linearly extending from the temperature control introduction port 48 to the first side surface 2*a* side extends along a part of the reaction passage part 28 adjacent in the stacking direction, the part being a part linearly extending from the confluence part 30 of the reaction passage 22 (see FIG. 2) toward the downstream side. In other words, in the first temperature control passage part 44 (see FIG. 3), a part thereof linearly extending from the temperature control introduction port 48 to the first side surface 2*a* side overlaps, and is arranged in parallel with, a range of the reaction passage 22 (see FIG. 2) adjacent thereto as viewed in the stacking direction, the range being a range of the reaction passage part 28 linearly extending from the confluence part 30 to the third side surface 2*c* side.

Further, in addition to the part linearly extending from the temperature control introduction port 48 to the first side surface 2*a* side, the first temperature control passage part 44 (see FIG. 3) includes a plurality of parts linearly extending in a direction perpendicular to the first side surface 2*a* and the third side surface 2*c*, in the region between the side surfaces 2*a* and 2*c*. These linear parts as well extend along the linear corresponding parts of the reaction passage parts 28 adjacent thereto in the stacking direction. The two first temperature control passage parts 44 of each temperature control passage 42 are arranged in parallel, with a distance therebetween. Further, likewise, the first temperature control passage parts 44 of the temperature control passages 42 adjacent to each other are also arranged in parallel, with a distance therebetween.

The second temperature control passage part 46 (see FIG. 3) is connected to the downstream-side end of the first temperature control passage part 44 corresponding thereto. The second temperature control passage part 46 is continuous from the first temperature control passage parts 44, and is formed in a meandering shape of going back and forth repeatedly between the first side surface 2*a* and the third side surface 2*c*. Each second temperature control passage part 46 includes a plurality of parts linearly extending in a direction perpendicular to the first side surface 2*a* and the third side surface 2*c*, in the region between the side surfaces 2*a* and 2*c*. These linear parts extend along the linear corresponding parts of the reaction passage parts 28 (see FIG. 2) adjacent thereto in the stacking direction. The second temperature control passage parts 46 of the temperature control passages 42 adjacent to each other are arranged in parallel, with a distance therebetween. Each temperature control discharge port 52 (see FIG. 3) is provided at the downstream-side end of each second temperature control passage part 46. Each temperature control discharge port 52 has an opening on the fourth side surface 2*d* (see FIG. 1) of the reactor 2.

Figure 4:
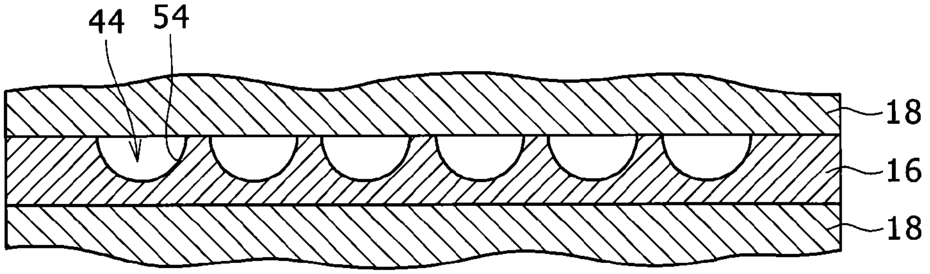
FIG. 4 is a partial cross-sectional view of the reactor according to one embodiment of the present invention, illustrating a cross section of a first temperature control passage part that is taken in a direction perpendicular to a flow direction of a temperature control fluid in the first temperature control passage part.
Figure 5:
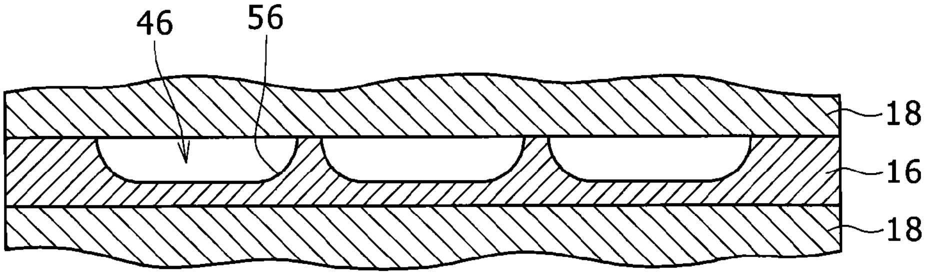
FIG. 5 is a partial cross-sectional view of the reactor according to one embodiment of the present invention, illustrating a cross section of a second temperature control passage part that is taken in a direction perpendicular to a flow direction of a temperature control fluid in the second temperature control passage part.

Each first temperature control passage part 44 has a cross section as illustrated in FIG. 4 as a cross section taken in a direction perpendicular to the flow direction of the temperature control fluid flowing in the first temperature control passage part 44 (hereinafter simply referred to as the cross section of the first temperature control passage part 44). Further, each second temperature control passage part 46 has a cross section as illustrated in FIG. 5 as a cross section taken in a direction perpendicular to the flow direction of the temperature control fluid flowing in the second temperature control passage part 46 (hereinafter simply referred to as the cross-section of the second temperature control passage part 46).

The area of the cross section of one second temperature control passage part 46 is greater than the area of the cross section of one first temperature control passage part 44. Further, the area of the cross section of one second temperature control passage part 46 belonging to the temperature control passage 42 is greater than the total area of the cross sections of two first temperature control passage parts 44 belonging to the same temperature control passage 42. Therefore, the total area of the cross sections of all of the second temperature control passage parts 46 provided in the reactor 2 is greater than the total area of the cross sections of all of the first temperature control passage parts 44 provided in the reactor 2. With this configuration in which the total area of the cross sections of all of the second temperature control passage parts 46 is greater than the total area of the cross sections of all of the first temperature control passage parts 44, the temperature control fluid has a smaller flow velocity in the second temperature control passage parts 46 as compared with that in the first temperature control passage parts 44.

On an upper surface of the temperature control passage substrate 16, which is one of plate surfaces thereof in the thickness direction, a plurality of first temperature control groove 54 (see FIGS. 3 and 4), which are very fine, and a plurality of second temperature control grooves 56 (see FIGS. 3 and 5), which are very fine, are formed by etching or the like; the first temperature control groove 54 are provided for forming the first temperature control passage parts 44, respectively, and the second temperature control grooves 56 are provided for forming the second temperature control passage parts 44, respectively. On the upper surface of each temperature control passage substrate 16, a sealing plate 18 (see FIGS. 4 and 5) is stacked and bonded. The openings of the first temperature control grooves 54 formed on the upper surface of the temperature control passage substrate 16 are sealed by the sealing plate 18 bonded onto the upper surface thereof, whereby the first temperature control passage parts 44 of the temperature control passage substrate 16 are formed. Further, the openings of the second temperature control grooves 56 formed on the upper surface of the temperature control passage substrate 16 are sealed by the sealing plate 18 bonded onto the upper surface thereof, whereby the second temperature control passage parts 46 of the temperature control passage substrate 16 are formed.

The first raw material supply header 4 (see FIG. 1) is attached to the first side surface 2*a* (see FIG. 1) of the reactor 2 so as to cover the first inlet ports 24*a* (see FIG. 2) all together. To the first raw material supply header 4, a first supply pipe 62 for supplying the first raw material fluid to the first raw material supply header 4 is connected. The first raw material supply header 4 divides the first raw material fluid supplied from the first supply pipe 62 and supplies the same to each first inlet port 24*a*.

The second raw material supply header 6 (see FIG. 1) is attached to the second side surface 2*b* (see FIG. 1) of the reactor 2 so as to cover the second inlet ports 26*a* (see FIG. 2) all together. To the second raw material supply header 6, a second supply pipe 64 for supplying the second raw material fluid to the second raw material supply header 6 is connected. The second raw material supply header 6 divides the second raw material fluid supplied from the second supply pipe 64 and supplies the same to each second inlet port 26*a*

The reaction fluid discharge header 8 (see FIG. 1) is attached to the first side surface 2*a* (see FIG. 1) of the reactor 2 so as to cover the reaction passage outlet ports 32 (see FIG. 2) all together. To the reaction fluid discharge header 8, a reaction fluid discharge pipe 66 (see FIG. 1) is connected. The reaction fluid discharge header 8 receives raw material fluids and reaction products discharged from the reaction passage outlet ports 32, and discharges the same all together to the reaction fluid discharge pipe 66.

The temperature control supply header 10 (see FIG. 1) is attached to the third side surface 2*c* (see FIG. 1) of the reactor 2 so as to cover the temperature control introduction ports 48 (see FIG. 3) all together. To the temperature control supply header 10, a temperature control supply pipe 68 for supplying the temperature control fluid to the temperature control supply header 10 is connected. The temperature control supply header 10 divides the temperature control fluid supplied from the temperature control supply pipe 68 and supplies the same to the temperature control introduction ports 48.

The temperature control discharge header 12 (see FIG. 1) is attached to the fourth side surface 2*d* (see FIG. 1) of the reactor 2 so as to cover the temperature control discharge ports 52 (see FIG. 3) all together. To the temperature control discharge header 12, the temperature control discharge pipe 70 (see FIG. 1) is connected. The temperature control discharge header 12 receives the temperature control fluid discharged from the temperature control discharge ports 52, and discharges the same all together to the temperature control discharge pipe 70.

Next, the following describes a reaction method using the reaction device 1 according to one embodiment of the present invention.

In the reaction method according to the present embodiment, the first raw material fluid is supplied from the first supply pipe 62 (see FIG. 1) via the first raw material supply header 4 to the first supply passage part 24 of each reaction passage 22 (see FIG. 2), and at the same time, the second raw material fluid is supplied from the second supply pipe 64 (see FIG. 1) via the second raw material supply header 6 to the second supply passage part 26 of each reaction passage 22 (see FIG. 2) (raw material supply step).

The first raw material fluid supplied to each first supply passage part 24 and the second raw material fluid supplied to each second supply passage part 26 join together in the confluence part 30 (see FIG. 2) corresponding thereto, and inflows into the reaction passage part 28 corresponding thereto. While flowing to the downstream side through the reaction passage part 28, the raw material fluids react with each other (reaction step). With this, a reaction product is produced. In the step of reaction in the reaction passage parts 28, the polymerization reaction between the first and second raw material fluids occurs. More specifically, addition polymerization reaction, polycondensation reaction, or polyaddition reaction occurs.

In the process of reaction between the first and second raw material fluids, reaction heat is generated. In particular, immediately after the confluence of the first and second raw material fluids in the confluence part 30, a large amount of reaction heat is generated.

On the other hand, in parallel with the raw material supply step and the reaction step, the temperature control fluid is circulated through each temperature control passage 42 (see FIG. 3), whereby the temperature control step for controlling the temperature of the raw material fluids flowing through the reaction passage part 28 of each reaction passage 22 (see FIG. 2), and at the same time, controlling the temperature upon the reaction between raw material fluids, is executed.

In the temperature control step, the temperature control fluid is supplied from the temperature control supply pipe 68 via the temperature control supply header 10 (see FIG. 1) to the temperature control introduction port 48 of each temperature control passage 42 (see FIG. 3). The temperature control fluid is supplied in a state in which it is preliminarily adjusted so as to have such a temperature that the reaction heat generated in the above-described reaction is cancelled. In other words, in the case where the reaction between the first and second raw material fluids is an exothermic reaction, the temperature control fluid is adjusted so as to have a low temperature; and in the case where the reaction between the first and second raw material fluids is an endothermic reaction, the temperature control fluid is adjusted so as to have a high temperature.

The temperature control fluid supplied to each temperature control introduction port 48 is introduced from the temperature control introduction port 48 to the first temperature control passage part 44 corresponding thereto, and flows to the downstream side. In this process in which the temperature control fluid flows through the first temperature control passage parts 44, a large amount of reaction heat generated at the confluence of the first and second raw material fluids in the confluence parts 30, and reaction heat generated in the process of circulation of the first and second raw material fluids up to the midpoints of the reaction passage parts 28, is removed. In the area of the upstream-side half, a multiplicity of the first temperature control passage parts 44 having small cross sections are arranged in parallel, and therefore, a large amount of reaction heat generated immediately after the confluence of the first and second raw material fluids is effectively removed. In the case where the reaction between the first and second raw material fluids is an exothermic reaction, a low-temperature temperature control fluid is caused to flow through each temperature control passage 42, whereby the temperature rise caused by the reaction heat is suppressed. On the other hand, in the case where the reaction between the first and second raw material fluids is an endothermic reaction, a high-temperature temperature control fluid is caused to flow through each temperature control passage 42, whereby the temperature reduction caused by the reaction heat is suppressed. Such suppression of temperature changes makes it possible to suppress the production of a byproduct in the reaction between the first and second raw material fluids.

The temperature control fluid having flown through each first temperature control passage part 44 flows into the second temperature control passage part 46 corresponding thereto. More specifically, in each temperature control passage 42, the temperature control fluid flows from two first temperature control passage parts 44 to one second temperature control passage part 46 connected to these first temperature control passage parts 44. In each reaction passage part 28, at a point corresponding to a connection part 50 where the downstream-side end of the first temperature control passage part 44 and the upstream-side end of the second temperature control passage part 46 are connected, the reaction between the raw material fluids have already proceeded considerably, and the amount of reaction heat generated there is small accordingly. In the downstream-side half area, only a fewer number of second temperature control passage parts 46 having larger cross sections are arranged, and hence, a smaller heat removal effect is achieved as compared with the upstream-side area where the first temperature control passage parts 44 are provided. However, since the amount of the reaction heat generated in the downstream-side half area is small, the reaction heat generated in the downstream-side half area is removed sufficiently, whereby temperature changes are suppressed.

The first and second raw material fluids and the reaction product produced by reaction between these raw material fluids, having flown through each reaction passage part 28, are discharged from each reaction passage outlet port 32 to the reaction fluid discharge header 8, and are collected from the reaction fluid discharge header 8 via the reaction fluid discharge pipe 66. Further, the temperature control fluid, having flown through the second temperature control passage part 46 of each temperature control passage 42, is discharged from each temperature control discharge port 52 to the temperature control discharge header 12, and is discharged from the temperature control discharge header 12 to the temperature control discharge pipe 70.

The reaction method according to the present embodiment is performed as described above.

In the present embodiment, the number of the first temperature control passage parts 44, having parts that extend along particular ranges from the confluence parts 30 to the reaction passage parts 28 on the downstream side in the reaction passages 22, and having smaller cross sections, is greater than the number of the second temperature control passage parts 46, which are connected to the downstream-side ends of the first temperature control passage parts 44. Therefore, in the vicinities of a region from the confluence parts 30 to a predetermined position on the downstream side in the reaction passages 22, where a large amount of reaction heat is generated, the heat removal effect of the temperature control fluid flowing through the first temperature control passage parts 44 can be improved, whereby temperature changes due to a large amount of reaction heat can be suppressed.

In addition, in the present embodiment, the number of the second temperature control passage parts 46, which are connected to the downstream side of the first temperature control passage parts 44, is smaller than the number of the first temperature control passage parts 44, and each second temperature control passage part 46 has a cross section having an area greater than that of the first temperature control passage part 44. This makes it possible to reduce the pressure loss in the second temperature control passage part 46. Therefore, even if the pressure loss increases in the first temperature control passage part 44 having a smaller cross section area, the reduction of the pressure loss in the second temperature control passage part 46 makes it possible to suppress an increase in the pressure loss in the temperature control passage 42 as a whole. Consequently, an increase in energy costs necessary for causing the temperature control fluid to flow through the temperature control passage 42 can be suppressed.

Further, in the downstream-side area where the second temperature control passage parts 46 are provided, the reaction between the raw material fluids in the reaction passage parts 28 have already proceeded, and the reaction heat generated therein is small. Therefore, even if the provision of fewer second temperature control passage parts 46 having a larger cross section area decreases the heat removal effect achieved by the temperature control fluid flowing through the second temperature control passage parts 46 as compared with the heat removal effect achieved by the first temperature control passage parts 44, temperature changes due to the reaction heat in the downstream-side areas of the reaction passage parts 28 can be sufficiently suppressed. In the present embodiment, therefore, in both of the area where a large amount of reaction heat is generated immediately after the confluence of the raw material fluids and the area where the reaction thereafter proceeds and the amount of the reaction heat decreases, a sufficient heat removal effect is exhibited appropriately so that temperature changes can be suppressed, whereby a decrease in the reaction yield of the main product can be suppressed.

Still further, in the present embodiment, the total area of cross sections of all of the second temperature control passage parts 46 provided in the reactor 2 is greater than the total area of cross sections of all of the first temperature control passage parts 44 provided in the reactor 2, the pressure loss in the second temperature control passage parts 46 can be reduced further. Therefore, an increase in the energy costs necessary for causing the temperature control fluid to flow through the temperature control passages 42 can be suppressed more surely.

Still further, in the reactor 2 according to the present embodiment, the reaction passage substrates 14 each of which includes a plurality of reaction passages 22 arranged in parallel, and the temperature control passage substrates 16 each of which includes a plurality of temperature control passage 42 arranged in parallel, are stacked alternately with the sealing plates 18 interposed therebetween. Therefore, the amount of the main product produced by the reaction between the raw material fluids in the reactor 2 as a whole can be increased, and at the same time, temperature changes can be suppressed by effectively removing the reaction heat generated by the reaction, whereby a decrease in the reaction yield of the main product can be suppressed.

Still further, in the present embodiment, the reaction device 1 that includes the above-described reactor 2 is used so that the polymerization reaction between the raw material fluids is caused to occur in each reaction passage part 28, whereby a product produced by the polymerization reaction can be obtained at a good yield.

Specific Example of Reaction

The following describes specific examples of reaction executed in the reactor 2 according to the above-described embodiment. More specifically, the following describes respective specific examples of addition polymerization reaction and polyaddition reaction executed in the reactor 2, and specific examples of the first and second raw material fluids used in each of the reactions.

As the addition polymerization reaction, for example, a reaction in which a radical copolymer is produced is executed. In this case, a monomer raw material solution containing a radically-polymerizable monomer is used as the first raw material fluid, and an initiator material solution containing a radical polymerization initiator is used as the second raw material fluid.

Specific examples of the radically-polymerizable monomer include: (meth)acrylic acids and esters of the same such as (meth)acrylic acid, methyl (meth)methacrylate, 2-ethylhexyl methacrylate, dodecyl (meth)acrylate, and 2-hydroxyethyl (meth)acrylate; dialkylaminoalkyl (meth)acrylate and salts thereof such as dimethylaminoethyl (meth)acrylate, dimethylaminoethyl (meth)acrylate hydrochloride, and dimethylaminoethyl (meth)acrylate p-toluenesulfonate; acrylamide derivatives such as (meth)acrylamide, and N,N-dimethyl(meth)acrylamide; vinyl-group-containing monomers such as vinyl acetate, vinyl stearate, N-vinylimidazole, N-vinylcaprolactam, and N-vinylcarbazole; N-vinyl cyclic lactam compounds such as N-vinyl-2-pyrrolidone, N-vinyl-5-methyl-2-pyrrolidone, N-vinyl-ϵ-caprolactam, and N-vinyl-7-methyl-ϵ-caprolactam; olefin derivatives such as ethylene, propylene, and isoprene; styrene derivatives such as styrene, α-methylstyrene, and p-styrenesulfonic acid; allylamine and derivatives of the same; and, acrylonitrile and derivatives of the same. Here, "(meth)acrylic acid" refers to acrylic acid or methacrylic acid.

As the radical polymerization initiator, anything selected appropriately according to the radically-polymerizable monomer contained in the monomer raw material solution, the type of the polymerization solvent, etc., can be used. Examples of the type of the radical polymerization initiator include organic peroxides, azo compounds, redox-type initiators, and persulfates.

Specific examples of the organic peroxide include: tert-butyl hydroperoxide, cumyl hydroperoxide, diisopropylbenzene hydroperoxide, tert-butyl peroxyneodecanoate, acetyl cyclohexyl sulfonyl peroxide, and disuccinic acid peroxide.

Specific examples of the azo compound includes: 2,2'-diamidinyl-2,2'-azopropane monohydrochloride, 2,2'-diamidinyl-2,2'-azobutane monohydrochloride, 2,2'-azobisisobutyronitrile, 2,2'-azobis-2-methylbthylonitrile, and 2,2'-azobis(2,4-dimethylvaleronitrile).

Examples of the redox-type initiator include a combination of a peroxide and a reducing agent. In this case, examples of the peroxide include hydrogen peroxide, tert-butyl hydroperoxide, and cumene hydroperoxide. Examples of the reducing agent include sulfites such as sodium sulfite, bisulfates such as sodium bisulfate, metal salts such as cuprous sulfate, ferrous sulfate, and L-ascorbic acid, and reducing sugars.

Further, examples of the radical polymerization reaction solvent used in the above-described monomer raw material solution and the above-described initiator material solution include water, alcohol (methanol, ethanol, isopropyl alcohol, etc.), ketones (acetone, methyl ethyl ketone, diethyl ketone, methyl isobutyl ketone, etc.), ethers (diethyl ether, dioxane, tetrahydrofuran, etc.), esters (acetic acid ethyl, butyl acetate, γ-butyrolactone, etc.), alkylene glycols (ethylene glycol, propylene glycol, propylene glycol monomethyl acetate, diethylene glycol monomethyl ether acetate, etc.), sulfonic acid esters (dimethyl sulfoxide, etc.), carbonic acid esters (dimethyl carbonate, diethyl carbonate, etc.), alicyclic carbonic acid ester (ethylene carbonate, propylene carbonate, etc.), hydrocarbon (hexane, cyclohexane, xylene, ethyl benzene, etc.), and halogenated hydrocarbon (chloroform, carbon tetrachloride, methyl chloride, etc.).

Further, as polymerization reaction, cationic polymerization reaction using no catalyst addition is carried out. In this case, for example, a fluid containing a cationically polymerizable monomer is used as the first raw material fluid, and a fluid containing a cation produced by electrolytic oxidation of a cationic precursor is used as the second raw material fluid.

Examples of the cationically polymerizable monomer include vinyl derivatives, and representative examples of the vinyl derivatives include: a monomer having its ethylene backbone substituted with an alkyl group or an aryl group, examples of which include derivatives such as isobutylene, styrene, and α-methyl styrene; vinyl ethers in which the substitution is via a heteroatom; vinyl sulfides; and derivatives such as N-vinylcarbazole. Among these, the monomers having particularly high cation-polymerizability are isobutyl vinyl ether, n-butyl vinyl ether, methyl vinyl sulfide, N-vinylcarbazole, and α-methyl styrene.

Further, in another cationic polymerization reaction, a fluid containing a cationically polymerizable monomer, for example, is used as the first raw material fluid, and a fluid containing a cationic polymerization initiator is used as the second raw material fluid.

Examples of the cationically polymerizable monomer in this case include vinyl derivatives, and representative examples of the vinyl derivatives include: a monomer having its ethylene backbone substituted with an alkyl group or an aryl group (e.g., isobutylene, styrene, α-methyl styrene, etc.); vinyl ethers such as isobutyl vinyl ether, n-butyl vinyl ether, and ethyl vinyl ether; vinyl ethers in which the substitution is via a heteroatom; vinyl sulfides such as methyl vinyl sulfide; and derivatives such as N-vinylcarbazole. Among these, isobutyl vinyl ether, n-butyl vinyl ether, propyl vinyl ether, ethyl vinyl ether, α-methyl styrene, methyl vinyl sulfide, N-vinylcarbazole, and the like are preferably used as the cationically polymerizable monomer.

Further, other examples of the cationically polymerizable monomer include tetrahydrofuran, 1,3-oxolane, 1,3-dioxepane, hexamethylcyclotrisiloxane, and octamethylcyclotetrasiloxane.

Further, examples of the cationic polymerization initiator include protonic acid, and a combination of a Lewis acid and a compound producing a cation.

Examples of the protonic acid include hydrochloric acid, sulfuric acid, methylsulfuric acid, trifluoroacetic acid, trifluoromethanesulfonic acid, fluorosulfonic acid, chlorosulfonic acid, and perchloric acid.

Examples of the Lewis acid include trifluoroboron, aluminum chloride, titanium tetrachloride, tin tetrachloride, iron chloride, and alkylaluminum dichloride.

Examples of the cation-producing compound to be combined with the Lewis acid include water, alcohol, acid, ether, and halogenated alkyl.

Further, in the case where radical polymerization reaction in which radically-polymerizable monomers are radically polymerized so that a radical polymer is produced is carried out as the addition polymerization reaction, for example, a fluid containing a radically-polymerizable monomer is used as the first raw material fluid, and a fluid containing a radical polymerization initiator is used as the second raw material fluid.

Examples of the radically-polymerizable monomer in this case include oil-soluble or water-soluble monomers. Examples of such monomers include olefins such as ethylene, propylene, and isobutylene; unsaturated monocarboxylic acids such as acrylic acid, and methacrylic acid; unsaturated polycarboxylic acids such as maleic acid, fumaric acid, maleic anhydride, and itaconic acid, and anhydrides of these acids; (meth)acrylic acid esters such as methyl acrylate, ethyl acrylate, dodecyl methacrylate, and 2-hydroxyethyl methacrylate; dialkylaminoalkyl (meth)acrylates such as dimethylaminoethyl acrylate, dimethylaminoethyl methacrylate, dimethylaminoethyl acrylate p-toluenesulfonic acid salt, and dimethylaminoethyl methacrylate p-toluenesulfonic acid salt, as well as addition salts of the same; acrylamide-based monomers such as acrylamide, methacrylamide, N-methylolacrylamide, and acrylamide-2-methylpropanesulfonic acid, as well as sodium salts of the same; and styrene-based monomers such as styrene, α-methyl styrene, and p-styrenesulfonic acid, as well as sodium salts and potassium salts of the same. In addition to these, the examples include: allylamine and addition salts of the same; vinyl acetate; acrylonitrile; N-vinylpyrrolidone; fluorine-containing monomers such as vinyl fluoride, vinylidene fluoride, and tetrafluoroethylene.

Further, examples of the radical polymerization initiator in this case include organic peroxides, azo compounds, disulfide compounds, redox-type initiators, and persulfates. Generally, in the case where the polymerization solvent is an aqueous medium, a water-soluble organic peroxide, a water-soluble azo compound, a redox-type initiator, a persulfate, or the like is preferably used; in the case where the polymerization solvent is an organic solvent, an oil-soluble organic peroxide, an oil-soluble azo compound, or the like is preferably used.

Examples of the above-described water-soluble organic peroxide include t-butyl hydroperoxide, cumyl hydroperoxide, 2,5-dimethylhexane-2,5-dihydroperoxide, and 1,1,3,3-tetramethyl hydroperoxide. Further, examples of the water-soluble azo compound include 2,2'-diamidinyl-2,2'-azopropane monohydrochloride, 2,2'-diamidinyl-2,2'-azobutane monohydrochloride, 2,2'-diamidinyl-2,2'-azopentane.monohydrochloride, and 2,2'-azobis(2-methyl-4-diethylamino)butyronitrile.hydrochloride.

Examples of the redox-type initiator include a combination of hydrogen peroxide and a reducing agent. In this case, examples used as the reducing agent include: metal ion such as divalent ferrous ion, copper ion, zinc ion, cobalt ion, and vanadium ion; ascorbic acid; and reducing sugar. Examples of the persulfate include ammonium persulfate, and potassium persulfate.

Examples of the oil-soluble organic peroxide include: diacyl peroxides such as dibenzoyl peroxide, di-3,5,5-trimethyl hexanoyl peroxide, and dilauroyl peroxide; peroxydicarbonates such as diisopropyl peroxydicarbonate, di-sec-butyl peroxydicarbonate, and di-2-ethyl hexyl peroxydicarbonate; peroxyesters such as t-butyl peroxypivalate, and t-butyl peroxyneodecanoate; acetyl cyclohexyl sulfonyl peroxide; and disuccinic acid peroxide.

Further, examples of the oil-soluble azo compound include 2,2'-azobisisobutyronitrile, 2,2'-azobis-2-methylbthylonitrile, and 2,2'-azobis(2,4-dimethylvaleronitrile).

Further, in the case where polymerization reaction in which cyclic olefin monomers are polymerized so that a cyclic olefin polymer is produced is carried out as the addition polymerization reaction, fluids containing cyclic olefin monomers to be polymerized are used as the first raw material fluid and the second raw material fluid, respectively.

Examples of the cyclic olefin monomer include: monocyclic compounds such as cyclohexene and cyclooctene; polycyclic compounds such as tetracyclopentadiene, and dihydro-tetracyclopentadiene; and substitution products of these monomers to which functional group are bonded.

Examples of the monomer of norbornene include the following, in addition to norbornene.

Examples of a norbornene monomer having an alkyl group include 5-methyl-2-norbornene, 5-ethyl-2-norbornene, 5-octyl-2-norbornene, 5-nonyl-2-norbornene, and 5-decyl-2-norbornene.

Examples of a norbornene monomer having an alkenyl group include 5-allyl-2-norbornene, 5-methylidyne-2-norbornene, 5-(5-ethyl-5-hexenyl)-2-norbornene, and 5-(1,2,3-trimethyl-4-pentenyl)-2-norbornene.

Examples of a norbornene monomer having an alkynyl group include 5-ethynyl-2-norbornene. Examples of a norbornene monomer having an aryl group include 5-phenyl-2-norbornene, 5-naphthyl-2-norbornene, and 5-pentafluorophenyl-2-norbornene.

Examples of a norbornene monomer having an aralkyl group include 5-benzyl-2-norbornene, 5-phenethyl-2-norbornene, and 5-(3-pentafluorophenylpropyl)-2-norbornene.

Examples of a norbornene monomer having an alkoxysilyl group include 5-trimethoxysilyl-2-norbornene, 5-triethoxysilyl-2-norbornene, 5-trimethylsilyl methyl ether-2-norbornene, and dimethyl-bis((5-norbornene-2-yl) methoxy))silane.

Examples of a norbornene monomer having a silyl group include 1,1,3,3,5,5-hexamethyl-1,5-dimethyl-bis((2-(5-norbornene-2-yl)ethyl)trisiloxane.

Examples of a norbornene monomer having a hydroxyl group, an ether group, a carboxyl group, an ester group, an acryloyl group, or a methacryloyl group include 5-norbornene-2-methanol and alkylethers of the same; acetic acid 5-norbornene-2-methyl ester; propionic acid 5-norbornene-2-methyl ester; (meth)acrylic acid 5-norbornene-2-i-propyl ester; (meth)acrylic acid 5-norbornene-2-hexyl ester; (meth) acrylic acid 5-norbornene-2-octyl ester; and (meth)acrylic acid 5-norbornene-2-decyl ester.

Examples of a norbornene monomer having an epoxy group include 5-methylglycidylether-2-norbornene, and 5-[(2,3-epoxypropoxy)methyl]-2-norbornene.

Further, examples of a norbornene monomer composed of a tetracyclic ring include 8-methoxy-carbonyl-tetracyclo $[4.4.0.1^{2,5}.1^{7,10}]$dodec-3-en, 8-ethoxy-carbonyl-tetracyclo $[4.4.0.1^{2,5}.1^{7,10}]$dodec-3-en, 8-n-propyl-carbonyl-tetracyclo $[4.4.0.1^{2,5}.1^{7,10}]$dodec-3-en, 8-methyl-tetracyclo$[4.4.0.1^{2,5}.0^{1,6}]$dodec-3-en, 8-ethylidene-tetracyclo$[4.4.0.1^{2,5}.1^{7,12}]$dodec-3-en, and 8-ethylidene-tetracyclo$[4.4.0.1^{2,5}.1^{7,10}.0^{1,6}]$dodec-3-en.

Further, in order to promote reaction in a polymerization reaction in which a cyclic olefin polymer is produced, a catalyst is preferably contained in the first raw material fluid and the second raw material fluid. Examples of this catalyst include single component catalysts and multicomponent catalysts.

Examples of the single component catalyst include those expressed by the following chemical formula.

[Chemical Formula 1]

Here, in the above-described chemical formula, "M" represents Ni or Pd, "$L_1$", "$L_2$", and "$L_3$" represent ligands of M. Only one ligand among $L_1$, $L_2$, and $L_3$ has a $\sigma$ bond, all the ligands collectively have 2 or 3 $\pi$ bonds. Further, in the chemical formula, "$CA^-$" represents a counter anion that is selected so that a cation is dissolved in a solvent.

In a catalyst expressed by the above-described chemical formula, it is preferable that M represents Ni or Pd, and the weakly coordinating neutral electron donating ligands $L_1$ to $L_3$ are selected from the group consisting of cyclo($C_8$-$C_{12}$) alkadiene, norbornadiene, cyclo($C_{10}$-$C_{20}$)trien, benzene, toluene, xylene, and mesitylene.

The weakly coordinating anion $CA^-$ is preferably selected from the group consisting of $BF_4^-$, $PF_6^-AlF_3O_3SCF_3^-$, $SbF_6^-$, $SbF_3SOF^-$, $B[C_6F_3]_4^-$, and $B[C_6H_3(CF_3)_2]_4^-$.

Examples of the above-described multicomponent catalyst include compounds of transition metals in Groups 8, 9, and 10; organic aluminum compounds; Lewis acids; super Bronsted acids; halogenated compounds; and electron donating compounds. "Multicomponent" means that the catalyst is selected from combinations and mixtures of compounds of transition metals in Group 8, organic aluminum compounds, Lewis acids, super Bronsted acids, halogenated compounds, and electron donating compounds.

The above-described Lewis acid is preferably selected from the group consisting of $BF_3$, etherate, $TiCl_3$, $SbF_5$, $BCl_3$, $B(OCH_2CH_3)_3$, and tris(perfluorophenyl)boron.

The above-described super Bronsted acid is preferably selected from the group consisting of $HSbF_6$, $HPF_6$, $CF_3CO_2H$, $FSO_3H.SbF_3$, $H_2C(SO_2CF)_2$, $CF_3SO_3H$, and para-toluenesulfonic acid.

The above-described halogenated compound is preferably selected from the group consisting of hexachloroacetone, hexafluoroacetone, 3-butenoic acid-2,2,3,4,4-pentachlorobutyl ester, hexafluoroglutaric acid, hexafluoroisopropanol, and chloranil.

The above-described electron donating compound is preferably selected from the group consisting of aliphatic and alicyclic diolefins, phosphines, and phosphites, as well as mixtures of these.

Examples of the compounds of transition metals in Groups 8, 9, and 10 include compounds that contain transition metal ions in Groups 8, 9, and 10 coupled with one or more types of backbones selected from the group consisting of ionic or neutral monodentate, bidentate and polydentate ligands, and mixtures of these.

The transition metal element that composes the transition metal compound is preferably selected from the group consisting of nickel acetylacetonates, nickel carboxylates, nickel dimethylglyoxime, nickel ethylhexanoate, cobalt neodecanoate, iron naphthenate, palladium ethylhexanoate, $NiCl_2(PPh_3)_2$, $NiCl_2(PPh_2CH_2)_2$, nickel(II) hexafluoroacetylacetonate tetrahydrate, nickel(II) trifluoroacetylacetonate dihydrate, nickel(II) acetylacetonate tetrahydrate, bisallyl nickel bromide, bisallyl nickel chloride, bisallyl nickel iodide, trans-$PdCl_2(PPh_3)_2$, palladium(II) bis(trifluoroacetate), palladium(II) (bis-acetylacetonate), palladium(II) 2-ethylhexanoate, $Pd(acetate)_2(PPh_3)_2$, palladium(II) bromide, palladium(II) chloride, palladium(II) iodide, palladium(II) oxide, monoacetonitrile-tris-(triphenylphosphine) palladium tetrafluoroborate, dichlorobis(acetonitrile) palladium(II), dichlorobis(triphenylphosphine)palladium (II), dichlorobis(benzonitrile)palladium (Ii), iron(II) chloride, iron(III) chloride, iron(II) bromide, iron(III) bromide, iron(II) acetate, iron(III) acetylacetonate, ferrocene, nickelocene, nickel(II) acetate, nickel bromide, nickel chloride, dichlorohexyl nickel acetate, nickel lactate, nickel oxide, nickel tetrafluoroborate, cobalt(II) acetate, cobalt(II) acetylacetonate, cobalt(III) acetylacetone, cobalt(II) benzoate, cobalt chloride, cobalt bromide, cyclohexyl cobalt acetates, cobalt(II) tetrafluoroborate, bis(allyl)nickel, bis(cyclopentadienyl)nickel, palladium acetylacetonate, palladium (acetonitrile)dichloride, palladium bis(dimethyl sulfoxide) dichloride, platinum bistriethylphosphine hydrobromide, ruthenium tris(triphenylphosphine)dichloride, ruthenium tris(triphenylphosphine)hydride chloride, ruthenium trichloride, ruthenium tetrakis(acetonitrile)dichloride, ruthenium tetrakis(dimethyl sulfoxide)dichloride, rhodium chloride, and rhodium tris(triphenylphosphine)trichloride. One type of the transition metal element may be used, or a combination of two or more of these may be used as required.

Preferable examples of the organic aluminum compound include trimethyl aluminum, triethyl aluminum, tri-n-propynyl aluminum, triisobutyl aluminum, tri-t-butyl aluminum, triisopropyl aluminum, tripentyl aluminum, tri-n-hexyl aluminum, tri(2-methyl pentyl)aluminum, tri-n-octyl aluminum, diethyl aluminum hydride, diisobutyl aluminum hydride, methyl aluminum sesqhichloride, isobutyl aluminum sesqhichloride, di-t-butyl aluminum chloride, diisopropyl aluminum chloride, dipentylaluminum chloride, methyl aluminum dichloride, ethyl aluminum chloride, isobutyl aluminum dichloride, t-butyl aluminum dichloride, isopropyl aluminum chloride, and pentyl aluminum dichloride.

The above-described halogenated compound is preferably selected from the group consisting of hexachloroacetone, hexafluoroacetone, 3-butenoic acid, 2,2,3,4,4-pentachlorobutyl ester, hexafluoroglutaric acid, hexafluoroisopropanol, and chloranil, as well as mixtures of these.

Further, in the case where a reaction for polymerizing a polymerizable monomer in the raw material fluids in order to produce resin microparticles is carried out as addition polymerization reaction, a fluid containing the polymerizable monomer is used as the first raw material fluid, and a fluid containing the polymerization initiator is used as the second raw material fluid.

Examples of the polymerizable monomer used in this production of resin microparticles include styrene, o-methyl styrene, m-methyl styrene, p-methyl styrene, 2-acrylamide-2-methylpropanesulfonic acid, acid phosphoxyethyl methacrylate, and 3-chloro-2-acid phosphoxypropyl methacrylate.

Further, in the case where resin microparticles having a crosslinked structure are to be produced, examples of the polymerizable monomer include multifunctional vinyls such as divinylbenzene, ethylene glycol dimethacrylate, neopentyl glycol dimethacrylate, and neopentyl glycol diacrylate.

Further, examples of the polymerization initiator used for producing resin microparticles include oil-soluble polymerization initiators and water-soluble polymerization initiators.

Examples of the above-described oil-soluble polymerization initiator include: azo-based or diazo-based polymerization initiator such as 2,2'-azobis-(2,4-dimethyl valeronitrile), 2,2'-azobisisobutyronitrile, 1,1'-azobis(cyclohexane-1-carbonitrile), 2,2'-azobis-4-methoxy-2,4-dimethyl valeronitrile, and azobis-isobutyronitrile; peroxide-based polymerization initiators such as benzoyl peroxide, methyl ethyl ketone peroxide, lauroyl peroxide, 2,2-bis-(4,4-t-butyl peroxy cyclohexyl)propane, and tris-(t-butyl peroxy)triazine; and macroinitiators having peroxide on side chains.

Examples of the water-soluble polymerization initiator include persulfates such as potassium persulfate and ammonium persulfate; azobis aminodipropane acetate, azobis cyanovaleric acid, and salts of the same; and hydrogen peroxide.

Further, in the case where a reaction for producing a fluoropolymer by radically polymerizing a fluoromonomer is carried out as the addition polymerization reaction, a fluid containing a fluoromonomer is used as the first raw material fluid, a fluid containing a radical polymerization initiator is used as the second raw material fluid.

Examples of the above-described fluoromonomer include fluoroolefins such as tetrafluoroethylene, hexafluoropropylene, vinylidene fluoride, 2-trifluoromethyl-3,3,3-trifluoro-1-propene, and perfluoro(butyl ethylene); perfluoro (alkyl vinyl ether) such as perfluoro(methyl vinyl ether), perfluoro (ethyl vinyl ether), and perfluoro(propyl vinyl ether); perfluoro(alkenyl vinyl ether) such as perfluoro(1,3-dioxole), perfluoro(butenyl vinyl ether); etheric oxygen-atom-containing cyclic perfluoro olefins such as perfluoro(2,2-dimethyl-1,3-dioxole), perfluoro-(2-methylene-4-methyl-1,3-dioxolane); (perfluoroalkyl)ethyl acrylate such as (perfluorobutyl)ethyl acrylate, (perfluorohexyl)ethyl acrylate, (perfluoroheptyl)methyl acrylate, and (perfluorooctyl) ethyl acrylate; (perfluoroalkyl)ethyl methacrylate such as (perfluorobutyl)ethyl methacrylate, (perfluorohexyl)ethyl methacrylate, (perfluoroheptyl)methyl methacrylate, and (perfluorooctyl)ethyl methacrylate; and fluorostyrenes such as α-fluorostyrene, β-fluorostyrene, α,β-difluorostyrene, 2,3,4,5,6-pentafluorostyrene, perfluoro(styrene), and 2,3,4,5,6-pentafluoro-α-methyl styrene.

Further, examples of the radical polymerization initiator used in this polymerization reaction of the fluoromonomer include inorganic peroxides such as potassium persulfate, and ammonium persulfate; redox-type initiators such as ammonium persulfate-ferrous sulfate, and ammonium persulfate-ammonium hydrogensulfite; water-soluble organic peroxides such as disuccinoyl persulfate; azo compounds such as azobisisobutyronitrile; diacyl peroxides such as bis-benzoyl peroxide, and dipentafluoro-propionyl peroxide; peroxy esters such as tert-butyl peroxy isobutyrate; hydroperoxides such as diisopropyl benzene hydroperoxide; acid peroxides such as succinic acid peroxide; and perfluoroperoxides such as bis-perfluoropropionyl peroxide, and bis-perfluorobenzoyl peroxide.

Further, a reaction for producing an emulsified dispersion composed of composite microparticles of a radical polymer and inorganic microparticles is carried out as the addition polymerization reaction, a fluid containing radically-polymerizable monomer is used as the first raw material fluid, and a fluid containing a water-soluble radical polymerization initiator is used as the second raw material fluid.

Examples of the radically-polymerizable monomer used for producing this emulsified dispersion include acrylic unsaturated monomers of alkyl (meth)acrylates having 1 to 30 carbon atoms such as methyl (meth)acrylate, ethyl (meth) acrylate, butyl (meth)acrylate, lauryl (meth)acrylate, and stearyl (meth)acrylate; alkylstyrenes such as styrene, methyl styrene, dimethyl styrene, heptylstyrene, and octylstyrene; halogenated styrenes such as fluorostyrene, chlorostyrene, bromostyrene, dibromostyrene, and chloromethylstyrene; styrene-based unsaturated monomers such as nitrostyrene, acetylstyrene, methoxy styrene, α-methyl styrene, and vinyl toluene; carboxylic-acid-group-containing unsaturated monomers and salts of the same such as (meth)acrylic acid, itaconic acid and monoester of the same, maleic acid and monoester of the same, fumaric acid and monoester of the same, itaconic acid and monoester of the same, crotonic acid, and p-vinylbenzoic acid; sulfonic-acid-group-containing unsaturated monomers and salts of the same such as 2-(meth)acrylamide-2-methylpropanesulfonic acid, vinyl sulfonic acid, sulfopropyl (meth)acrylate, and α-methyl styrene sulfonic acid; tertiary or quaternary amino-group-containing unsaturated monomers such as dimethyl amino ethyl (meth)acrylate, diethylamino ethyl (meth)acrylate, (meth)allyl triethyl ammonium chloride, and 2-hydroxy-3-(meth)acryloyloxypropyl trimethyl ammonium chloride; hydroxy-group-containing unsaturated monomers such as hydroxyethyl (meth)acrylate, hydroxypropyl (meth)acrylate, and polyethylene glycol mono(meth)acrylate; amide-group-containing unsaturated monomers such as (meth) acrylamide, N-hydroxyalkyl (meth)acrylamide, N-alkyl (meth)acrylamide, N,N-dialkyl (meth)acrylamide, and vinyl lactams; diesters of unsaturated dibasic acids such as maleic acid, fumaric acid, and itaconic acid; aromatic unsaturated monomers such as styrene, p-methyl styrene, α-methyl styrene, p-chlorostyrene, chloromethylstyrene, and vinyl toluene; nitrile-based unsaturated monomers of acrylonitrile, and methacrylonitrile; conjugated diolefins of unsaturated monomers such as butadiene and isoprene; multifunctional unsaturated monomers such as divinylbenzene, ethylene glycol diacrylate, polyethylene glycol dimethacrylate, polyethylene, and glycol diacrylate; vinyl-based unsaturated monomers such as ethylene, propylene, and isobutylene; vinyl ester unsaturated monomers such as vinyl acetate, propionic acid vinyl, octyl vinyl ester, VEOVA 9, VEOVA 10, and VEOVA 11 (VEOVA: registered trademark); vinyl ether unsaturated monomers such as ethyl vinyl ether, propyl vinyl ether, butyl vinyl ether, and cyclohexyl vinyl ether; allyl ether unsaturated monomers such as ethyl allyl ether; halogen-containing unsaturated monomers such as vinyl chloride, vinyl bromide, vinylidene chloride, perfluoroalkyl acrylate, fluoromethacrylate; epoxy-group-containing unsaturated monomers such as glycidyl (meth)acrylate, and glycidyl methacrylate; vinyl-silane-based unsaturated monomers such as vinyl trichlorosilane, vinyl triethoxysilane, vinyl tris(β-methoxy ethoxy)silane, and γ-methacryloxypropyl trimethoxysilane; carbonyl-group-containing unsaturated monomers such as acrolein, diacetone acrylamide, vinyl acetophenone, and vinyl benzophenone.

Further, examples of the water-soluble radical polymerization initiator used for producing this emulsified dispersion include water-soluble organic peroxides, water-soluble azo compounds, redox-type initiators, and persulfates.

Examples of the water-soluble organic peroxide include t-butyl hydroperoxide, cumyl hydroperoxide, diisopropylbenzene hydroperoxide, p-menthane hydroperoxide, 2,5-dimethylhexane-2,5-dihydroperoxide, and 1,1,3,3-tetramethyl hydroperoxide.

Examples of the water-soluble azo compound include 2,2'-diamidinyl-2,2'-azopropane monohydrochloride, 2,2'-diamidinyl-2,2'-azobutane monohydrochloride, 2,2'-diamidinyl-2,2'-azopentane.monohydrochloride, and 2,2'-azobis(2-methyl-4-diethylamino)butyronitrile.hydrochloride.

Examples of the redox-type initiator include a combination of hydrogen peroxide and a reducing agent. In this case, any one of metal ion such as divalent ferrous ion copper ion, zinc ion, cobalt ion, and vanadium ion, ascorbic acid, as well as reducing sugar is used as the reducing agent.

Examples of the persulfate include ammonium persulfate, potassium persulfate, and sodium persulfate.

Further, in the case where a reaction for radically polymerizing an α,β-ethylenically unsaturated monomer so as to produce a polymer is carried out as the addition polymerization reaction, a fluid containing the α,β-ethylenically unsaturated monomer is used as the first raw material fluid, and a fluid containing a polymerization initiator is used as the second raw material fluid.

The α,β-ethylenically unsaturated monomer used in this case is, for example, selected from the group consisting of: monoethylenically unsaturated carboxylic acids, sulfonic acids, and phosphonic acids; esters of α,β-ethylenically unsaturated mono- and di-carboxylic acids and $C_1$-$C_{20}$-alkanols; vinyl aromatic compounds; esters of vinyl alcohol and $C_1$-$C_{30}$-monocarboxylic acids; ethylenically unsaturated nitrile; halogenated vinyl; vinylidene halide; esters of α,β-ethylenically unsaturated mono- and di-carboxylic acids and $C_2$-$C_{30}$-alkanediols; amides of α,β-ethylenically unsaturated mono- and di-carboxylic acids and $C_2$-$C_{30}$-amino alcohols (having primary or secondary amino group); primary amides of α,β-ethylenically unsaturated monocarboxylic acids and N-alkyl; primary amides of these and N,N-dialkyl derivatives; N-vinyl lactam; open-chain N-vinyl amide compounds; esters of allyl alcohol and $C_1$-$C_{30}$-monocarboxylic acids; esters of α,β-ethylenically unsaturated mono- and dicarboxylic acids and amino alcohol; amides of α,β-ethylenically unsaturated mono- and dicarboxylic acids and diamines (having at least one primary or secondary amino group); N,N-diallylamine; N,N-diallyl-N-alkyl amine; vinyl- and allyl-substituted nitrogen heterocycle, and vinyl ether; $C_2$-$C_8$-monoolefin, and non-aromatic hydrocarbons having at least two conjugated double bonds; polyether (meth)acrylate; monomers having a urea group; and mixtures of these.

Examples of ethylenically unsaturated carboxylic acid, sulfonic acid, and phosphonic acid, and derivatives of these include acrylic acid, methacrylic acid, ethacrylic acid, aconitic acid, fumaric acid, monoesters of monoethylenically unsaturated dicarboxylic acids having 4 to 10 carbon atoms, or preferably 4 to 6 carbon atoms, for example, monomethyl maleate, sulfopropyl acrylate, vinyl phosphonic acid, and allyl phosphonic acid. Further, a monomer having an acidic group can be used for polymerization in a free acid state, or in a partially or entirely neutralized state.

Examples of the α,β-ethylenically unsaturated mono- and dicarboxylic acids and esters of $C_1$-$C_{20}$-alkanol include methyl (meth)acrylate, methyl ethacrylate, ethyl (meth)acrylate, linolenyl (meth)acrylate, stearyl (meth)acrylate, lauryl (meth)acrylate, and mixtures of these.

Examples of the vinyl aromatic compounds include styrene, 2-methyl styrene, 4-(n-butyl)styrene, and 4-(n-decyl) styrene. Among these, styrene is most preferable.

Examples of the esters of vinyl alcohol and $C_1$-$C_{30}$-monocarboxylic acids include vinyl formate, vinyl acetate, vinyl propionate, vinyl versatate, and mixtures of these.

Examples of the ethylenically unsaturated nitrile include acrylonitrile, methacrylonitrile, and mixtures of these.

Examples of the halogenated vinyl and the halogenated vinylidene include vinyl chloride, vinylidene chloride, vinyl fluoride, vinylidene fluoride, and mixtures of these.

Examples of the esters of α,β-ethylenically unsaturated mono- and dicarboxylic acids and $C_2$-$C_{30}$-alkanediols include 2-hydroxyethyl acrylate, 2-hydroxyethyl methacrylate, 3-hydroxy-2-ethyl hexyl acrylate, and 3-hydroxy-2-ethyl hexyl methacrylate.

Examples of appropriate primary amines of α,β-ethylenically unsaturated monocarboxylic acids and N-alkyl, as well as N,N-dialkyl derivatives of these include acrylamide, methacrylamide, N-methyl (meth)acrylamide, N,N-dimethyl (meth)acrylamide, and morpholinyl (meth)acrylamide.

Examples of N-vinyl lactam and derivatives of these include N-vinylpyrrolidone, N-vinyl piperidone, N-vinyl-7-methyl-2-caprolactam, and N-vinyl-7-ethyl-2-caprolactam.

Examples of the open-chain N-vinyl aramid compound include N-vinyl formamide, N-vinyl-N-methylform aramid, N-vinyl-N-methyl propionamide, and N-vinyl butyl amide.

Examples of the esters of α,β-ethylenically unsaturated mono- and dicarboxylic acids and amino alcohol include N,N-dimethyl amino methyl (meth)acrylate, N,N-dimethyl amino ethyl (meth)acrylate, N,N-diethylamino propyl (meth)acrylate, and N,N-dimethyl amino cyclohexyl (meth) acrylate.

Examples of the amides of α,β-ethylenically unsaturated mono- and dicarboxylic acids and diamines having at least one primary amino or secondary amino group include N-[2-(dimethyl amino)ethyl]acrylamide, N-[2-(dimethylamino) ethyl]methacrylamide, N-[4-(dimethylamino)cyclohexyl] acrylamide, and N-[4-(dimethylamino)cyclohexyl] methacrylamide.

Examples of appropriate monomers include N, N-diallylamine, N,N-diallyl-N-alkyl amine, and acid added salts of these, as well as quaternized products. Here, alkyls of $C_1$-$C_{24}$ are preferably used as the alkyl. More specifically, examples of preferable monomers include N,N-diallyl-N-methyl amine and N,N-diallyl-N,N-dimethyl ammonium compounds, for example, chlorides and bromides.

Further, examples of appropriate monomers include vinyl and allyl-substituted nitrogen heterocycles, vinyl and allyl-substituted aromatic compounds, and salts of these. Examples of the vinyl and allyl-substituted nitrogen heterocycles include N-vinylimidazole, and N-vinyl-2-methyl imidazole. Examples of the vinyl and allyl-substituted aromatic compounds include 2- and 4-vinyl pyridine, and 2- and 4-allyl pyridine.

Examples of the $C_2$-$C_8$-monoolefin, and non-aromatic hydrocarbons having at least two conjugated double bonds include ethylene, propylene, isobutylene, isoprene, and butadiene.

Further, examples of the polyaddition reaction include polyaddition reaction in which a polyaddition monomer, and another polyaddition monomer that can react with the foregoing polyaddition monomer are caused to react with each other in a solvent so that polymer microparticles such as polyurethane microparticles, polyurea microparticles, and polyamic acid microparticles are produced. In this case, a fluid containing one of the polyaddition monomers is used as the first raw material fluid, and a fluid containing the other polyaddition monomer that can react with the foregoing polyaddition monomer is used as the second raw material fluid.

In the polyaddition reaction carried out for producing polyurethane microparticles, for example, diols are used as the one polyaddition monomer, and diisocyanates are used as the other polyaddition monomer.

Examples of the diols include various types of known saturated or unsaturated low-molecule glycols such as ethylene glycol, diethylene glycol, triethylene glycol, dipropylene glycol, and 1,4-cyclohexane dimethanol; diols obtained by hydrogenating dimer acids; ethylene oxide adducts of bisphenol A; polycarbonate polyols; and polybutadiene polyols.

Examples of diisocyanates include chain aliphatic diisocyanates such as methylene diisocyanate, isopropylene diisocyanate, butane-1,4-diisocyanate, hexamethylene diisocyanate, 2,2,4-trimethyl hexamethylene diisocyanate, 2,4,4-trimethyl hexamethylene diisocyanate, and dimer diisocyanate in which a carboxyl group that a dimer acid has is replaced with an isocyanate group; cyclic aliphatic diisocyanates such as cyclohexane-1,4-diisocyanate, isophorone diisocyanate, dicyclohexyl methane-4,4'-diisocyanate, 1,3-di(isocyanate methyl)cyclohexane, and methyl cyclohexane diisocyanate; aromatic diisocyanates examples of which include dialkyl diphenyl methane diisocyanate such as 4,4'-diphenyl dimethyl methane diisocyanate, tetraalkyl diphenyl methane diisocyanate such as 4,4'-diphenyl tetramethyl methane diisocyanate, 1,5-naphthylene diisocyanate, xylylene diisocyanate, and m-tetramethyl xylylene diisocyanate; and amino acid diisocyanates such as lysine diisocyanate.

In polyaddition reaction carried out for producing polyurea microparticles, for example, diamines are used as the one of polyaddition monomers, and diisocyanates are used as the other polyaddition monomer.

Examples of diamines include aromatic diamines such as 4,4'-diamino diphenyl methane (DDM), 4,4'-diamino diphenyl ether (DPE), R(+)-2,2'-diamino-1,1'-binaphthalene, and S(+)-2,2'-diamino-1,1'-binaphthalene; alicyclic diamines such as 1,2-diaminomethane, 1,4-diaminobutane, bis(4-amino cyclohexyl)methane, and 4,4'-diamino dicyclohexyl methane. In addition to these, examples of the same include 3,4-diamino pyridine, and 1,4-diamino-2-butanone.

Further, examples of diisocyanates used in the case of producing polyurea microparticles include those identical to the examples of diisocyanates used in the case of producing the polyurethane microparticles.

In polyaddition reaction carried out for producing the polyamic acid microparticles, for example, anhydrous tetracarboxylic acids are used as the one of polyaddition monomers, and diamines are used as the other polyaddition monomer.

Examples of the anhydrous tetracarboxylic acid include aromatic tetracarboxylic acid dianhydrides such as 3,3',4,4'-benzophenone tetracarboxylic acid dianhydride (BTDA), 3,3',4,4'-biphenyl tetracarboxylic acid dianhydride, anthracene-2,3,6,7-tetracarboxylic acid dianhydride, and phenanthrene-1,8,9,10-tetracarboxylic acid dianhydride; aliphatic tetracarboxylic acid dianhydrides such as butane-1,2,3,4-tetracarboxylic acid dianhydride; alicyclic tetracarboxylic acid dianhydrides such as cyclobutane-1,2,3,4-tetracarboxylic acid dianhydride; and heterocyclic tetracarboxylic acid dianhydride such as thiophene-2,3,4,5-tetracarboxylic acid dianhydride, and pyridine-2,3,5,6-tetracarboxylic acid anhydride.

Further, examples of diamines used in the case of producing polyamic acid microparticles include those identical to the examples of diamines used for producing the polyurea microparticles.

It should be noted that the embodiments and examples disclosed herein should be considered to be illustrative and non-limiting in all respects. The scope of the present invention is defined not by the above descriptions of the embodiments but by the scope of claims, and includes all modifications within the scope of claims and meanings equivalent to the same.

Figure 6:
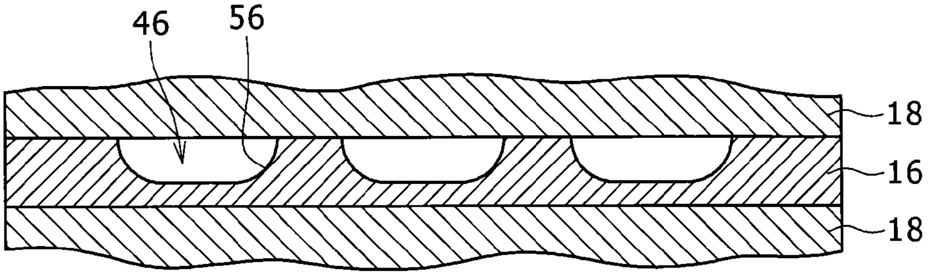
FIG. 6 is a partial cross-sectional view of a reactor according to a modification example of one embodiment of the present invention, illustrating a cross section of a second temperature control passage part that is taken in a direction perpendicular to a flow direction of a temperature control fluid in the second temperature control passage part.

For example, the cross section area of one second temperature control passage part 46 that each temperature control passage 42 may be equal to the cross section area of two first temperature control passage part 44 that each temperature control passage 42 has. In other words, in each temperature control passage 42, the transition from the two first temperature control passage parts 44 to the second temperature control passage part 46 does not result in a change in the cross section area, but the cross section area is uniform. FIG. 6 illustrates the cross section of the second temperature control passage part 46 in this configuration. In this configuration, the flow passage width of each second temperature control passage part 46 in the direction along the plate surface of the temperature control passage substrate 16 is smaller than the flow passage width of each second temperature control passage part 46 in the same direction according to the above-described embodiment (see FIG. 5). According to this configuration, the total area of the cross sections of all of the second temperature control passage parts 46 provided in the reactor 2 is equal to the total area of the cross sections of all of the first temperature control passage parts 44 provided in the reactor 2.

In this configuration, the total area of the cross sections of all of the first temperature control passage parts 44 and the total area of the cross sections of all of the second temperature control passage parts 46 are equal to each other, but as the number of the second temperature control passage parts 46 is smaller than the number of the first temperature control passage parts 44, the pressure loss in the second temperature control passage parts 46 can be reduced. Though the effect achieved herein is smaller than that in the above-described embodiment, this configuration makes it possible to suppress an increase in energy costs necessary for causing the temperature control fluid through the temperature control passages 42.

The following describes results of simulations carried out for studying the effect of reducing pressure loss by setting conditions of one specific example of the foregoing configuration (hereinafter referred to as Example).

The conditions in Example are as follows. The total length of the temperature control passage is set to 6000 mm. The length of the first temperature control passage part is set to 3000 mm; the flow passage width of the first temperature control passage part is set to 2 mm; the depth of the first temperature control passage part in the thickness direction of the temperature control passage substrate is set to 1 mm. In this case, the area of the cross section of one first temperature control passage part is $1.57\times10^{-6}$ $m^2$. Further, the number of the first temperature control passage parts is set to 6. In this case, the total area of the cross sections of the six first temperature control passage parts is $9.42\times10^{-6}$ $m^2$. Further, the length of the second temperature control passage part is set to 3000 mm; the flow passage width of the second temperature control passage part is set to 4 mm; and the depth of the second temperature control passage part in the thickness direction of the depth of the temperature control passage substrate is set to 1 mm. In this case, the area of the cross section of one second temperature control passage part is $3.57\times10^{-6}$ $m^2$. Further, the number of the second temperature control passage parts is set to 3. in this case, the total area of the cross sections of the three second temperature control passage parts is $2.14\times10^{-5}$ $m^2$.

On the other hand, as Comparative Example, the following case is set: each temperature control passage has the same flow passage width and depth as those of each first temperature control passage part in Example over the total length of 6000 mm, and six of such temperature control passages are provided. In other words, in this comparative example, the area of the cross section of one temperature control passage is $1.57\times10^{-6}$ $m^2$, and the total area of the cross sections of the six temperature control passages is $9.42\times10^{-6}$ $m^2$.

Then, a temperature control fluid having a viscosity of 0.001 Pa·s is flown through the temperature control passages of Example and Comparative Example at a flow velocity of 3.6 L/h. In this case, in Example, the flow velocity in the first temperature control passage part is 0.106 m/s, and the total pressure loss in the six first temperature control passage parts is 6.821 kPa. Further, in Example, the flow velocity in the second temperature control passage part is 0.047 m/s, and the total pressure loss in the three second temperature control passage parts is 1.835 kPa. As a result, the total pressure loss in all of the first temperature control passage parts and the second temperature control passage parts is 8.656 kPa.

On the other hand, in Comparative Example, the flow velocity of the entire temperature control passages is 0.106 m/s. Further, the total pressure loss in the first half of the temperature control passages of Comparative Example, which corresponds to the first temperature control passage parts of Example, is 6.821 kPa. Further, the total pressure loss in the last half of the temperature control passage of Comparative Example, which corresponds to the second temperature control passage parts of Example, is also 6.821 kPa. As a result, the total pressure loss in all of the temperature control passages is 13.642 kPa.

The result described above clarifies that the configuration of Example makes it possible to suppress the total pressure loss in all of the temperature control passages to about 60% with respect to the configuration of Comparative Example.

Further, the temperature control passages may be formed in the following manner: the first temperature control passage parts 44 illustrated in FIG. 4 are connected to the second temperature control passage parts 46 illustrated in FIG. 6, and further, the second temperature control passage parts 46 are connected to third temperature control passages having cross sections in the same shape as that of the second temperature control passage part 46 illustrated in FIG. 5 according to the above-described embodiment. In this case, as compared with the first temperature control passage parts 44, the second temperature control passage parts 46 have smaller pressure loss, and as compared with the second temperature control passage parts 46, the third temperature control passage parts have further smaller pressure loss.

Further, the positions of the connection parts 50 where the downstream-side ends of the first temperature control passage part 44 and the upstream-side ends of the second temperature control passage parts 46 are connected are not necessarily limited to the positions illustrated in FIG. 3, and can be varied to a variety of positions.

Further, the above-described embodiment is described with reference to an example in which polymerization reaction between the raw material fluids is caused to occur, but the reaction method using the reactor according to the present invention is not necessarily limited to a method for polymerization reaction. For example, the reaction method using the reactor according to the present invention is applicable to a reaction method for chemical reaction other than the polymerization reaction.

Further, as the shape of the reaction passage and the shape of the temperature control passage, a variety of shapes are applicable, other than the shapes proposed in the above-described embodiment. For example, the reaction passage parts of the reaction passages and the temperature control passages does not have to be in the meandering shape as described above, but may linearly extend.

Further, each reaction passage may have three or more supply passage parts. In this case, three or more raw material fluids, the number of which corresponds to the number of the supply passage parts, may be supplied to the supply passage parts, respectively.

Further, in the above-described embodiment, in each temperature control passage, two first temperature control passage parts are connected to one second temperature control passage part, but the configuration is not necessarily limited to this configuration. For example, in each temperature control passage, three or more first temperature control passage parts may be connected to one second temperature control passage part. Further, in the case where each temperature control passage includes three or more first temperature control passage parts, a plurality of second temperature control passage parts, the number of which is smaller than the number of the first temperature control passage parts, may be connected to the three or more first temperature control passage parts.

Further, the directions in which the reactor and the reaction device are arranged are not necessarily limited to the directions indicated in the above-described embodiment. For example, the reaction device may be arranged so that the reactor indicated in the above-described embodiment is arranged upside down, or the reaction device may be arranged so that the upper and lower surfaces of the reactor indicated in the above-described embodiment are directed in various directions other than the upward and downward directions.

This application is based on Japanese Patent Application 2014-095350, filed on May 2, 2014, the content of which is incorporated herein by reference.

What is claimed is:

1. A reactor comprising:

a reaction passage that is a fine flow passage that allows a plurality of different raw material fluids to react with each other while the raw material fluids are being circulated therethrough; and a temperature control passage that is a fine flow passage that allows a temperature control fluid to be circulated therethrough, the temperature control fluid being used for controlling temperature of the raw material fluids flowing through the reaction passage, wherein the reaction passage includes: a plurality of supply passage parts to which the plurality of the different raw material fluids are introduced, respectively; a confluence part that is connected to downstream-side ends of the plurality of the supply passage parts and allows the plurality of the raw material fluids inflowing from the plurality of the supply passage parts to join; and a reaction passage part that is connected to a downstream side of the confluence part and allows the plurality of the raw material fluids inflowing from the confluence part to react with each other while being circulated therethrough, wherein the temperature control passage includes: a plurality of first temperature control passage parts each of which has a part that extends along at least a particular range from the confluence part to the reaction passage part on the downstream side, in the reaction passage; and a second temperature control passage part that is connected to downstream-side ends of the plurality of the first temperature control passage parts, the number of the second temperature control passage part being smaller than the number of the plurality of the first temperature control passage parts, and wherein an area of a cross section of the second temperature control passage part in a direction perpendicular to a flow direction of the temperature control fluid in the second temperature control passage part is greater than an area of a cross section of each first temperature control passage part in a direction perpendicular to a flow direction of the temperature control fluid in the first temperature control passage part.

2. The reactor according to claim 1, wherein the area of the cross section of the second temperature control passage part is greater than a sum of the areas of the cross sections of the plurality of the first temperature control passage parts.

3. The reactor according to claim 1, further comprising:

a plurality of reaction passage layers in each of which a plurality of the reaction passages arranged in parallel are provided; and a plurality of temperature control passage layers in each of which a plurality of the temperature control passages arranged in parallel are provided, wherein the reaction passage layers and the temperature control passage layers are alternately stacked.

4. The reactor according to claim 2, further comprising:

a plurality of reaction passage layers in each of which a plurality of the reaction passages arranged in parallel are provided; and a plurality of temperature control passage layers in each of which a plurality of the temperature control passages arranged in parallel are provided, wherein the reaction passage layers and the temperature control passage layers are alternately stacked.

* * * * *